(12) United States Patent
Granström

(10) Patent No.: US 8,966,571 B2
(45) Date of Patent: Feb. 24, 2015

(54) DETECTION OF POTENTIALLY COPYRIGHTED CONTENT IN USER-INITIATED LIVE STREAMS

(75) Inventor: Johan Georg Granström, Zurich (CH)

(73) Assignee: Google Inc., Mountain View, CA (US)

(*) Notice: Subject to any disclaimer, the term of this patent is extended or adjusted under 35 U.S.C. 154(b) by 100 days.

(21) Appl. No.: 13/438,546

(22) Filed: Apr. 3, 2012

(65) Prior Publication Data
US 2013/0263207 A1  Oct. 3, 2013

(51) Int. Cl.
*G06F 17/00* (2006.01)
(52) U.S. Cl.
USPC .......... 726/1; 713/176; 713/182; 713/186; 382/115; 382/116; 382/124; 382/126; 235/382; 235/382.5; 725/86; 707/999.107
(58) Field of Classification Search
CPC ... G06F 21/10; G06F 12/14; G06F 17/30038; G06F 7/00; G06F 17/211; G06F 17/30743; G06F 17/30758; G06F 17/30864; G06F 17/30; G06F 21/00; H04N 7/16; H04N 21/23418; H04N 1/32203; H04N 1/32208; H04N 1/32229; H04N 2201/3233; H04N 2201/3235; H04N 11/02; H04N 11/04; H04K 1/02
USPC ............ 726/1; 382/115, 116, 124, 126; 235/382, 382.5; 707/999.107; 713/176, 713/182, 186; 725/86
See application file for complete search history.

(56) References Cited

U.S. PATENT DOCUMENTS

| | | | |
|---|---|---|---|
| 6,519,571 B1 * | 2/2003 | Guheen et al. | 705/14.66 |
| 7,080,253 B2 * | 7/2006 | Weare | 713/176 |
| 7,363,278 B2 † | 4/2008 | Schmelzer | |
| 7,565,327 B2 | 7/2009 | Schmelzer | |
| 7,707,088 B2 | 4/2010 | Schmelzer | |
| 8,408,456 B2 * | 4/2013 | Weintraub et al. | 235/382 |
| 2005/0193016 A1 * | 9/2005 | Seet et al. | 707/104.1 |
| 2009/0175538 A1 | 7/2009 | Bronstein et al. | |
| 2009/0328236 A1 | 12/2009 | Schmelzer | |
| 2010/0290666 A1 | 11/2010 | Rhoads | |
| 2011/0122255 A1 | 5/2011 | Haritaoglu | |
| 2011/0247042 A1 * | 10/2011 | Mallinson | 725/86 |

OTHER PUBLICATIONS

International Search Report and Written Opinion for International Application No. PCT/US13/35036, dated Aug. 8, 2013, 14 pages.
(Continued)

*Primary Examiner* — Thanhnga B Truong
(74) *Attorney, Agent, or Firm* — Amin, Turocy & Watson, LLP

(57) ABSTRACT

Systems and methods modifying a presentation of media content in response to a detected violation are provided. In particular, media content such as a media stream broadcasted by a user to other users can be monitored. The broadcasted media stream can be fingerprinted and compared to a fingerprint repository that includes entries associated with media content that is copyrighted or otherwise considered a violation. If the fingerprint matches entries included in the fingerprint repository, then the media stream can be modified such as modified to terminate.

17 Claims, 10 Drawing Sheets

(56) References Cited

OTHER PUBLICATIONS

Altnet Launches Global File Registry, P2P File Sharing, http://www.p2p-weblog.com/50226711/altnet_launches_global_file_registry.php, Last accessed Apr. 12, 2012.

Global File Registry, http://www.globalfileregistry.com/assets/Global_File_Registry_White_Paper_pdf, Last accessed Apr. 12, 2012.

\* cited by examiner
† cited by third party

DETECTION OF POTENTIALLY COPYRIGHTED CONTENT IN USER-INITIATED LIVE STREAMS

This disclosure generally relates to modifying (e.g., terminating, interrupting, etc.) a presentation of media content in response to detection of potentially copyrighted content and/or other use-violations in user-initiated live streams.

BACKGROUND

Many conventional service providers allow users to broadcast media content to other users. Such media content is often disseminated by way of live streaming broadcast. For example, the media content is streamed from broadcasting users that upload/broadcast the media content to recipient users that present the received media content. Typically, the service providers provide the network infrastructure for the users, but very little else. Therefore, these service providers have very limited control over what media content is broadcast, such as, e.g., copyrighted media content.

Current copyright protection schemes compare uploaded media content to an index of validated and protected content. If a match is made, a copyright claim is generated against the uploaded media content. Live video and audio streams can also be protected from matching content that is uploaded after the live video stream is received, as an index of validated content can be generated as the live media is received and processed. Any subsequently uploaded user video captured can be compared against the validated content to identify if the uploaded user video is unauthorized.

However, when a stream of media is created in real-time or near real-time, processing in the transcoding pipeline can sometimes take a long time and interruptions between when the public broadcast occurs and when the reference is uploaded can cause delays such that the user uploaded content is uploaded before the live stream is indexed. If user uploaded content is uploaded first or at a time when the matching system is offline, it will not match against the live reference since the reference has not yet been indexed. When the live reference is activated in the match system, it will claim newly uploaded user content but will not claim the previously uploaded user content.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems disclosed herein relate to modifying a presentation of media content in response to a detected violation. A monitor component can be configured to construct fingerprints of segments of media content and to construct patterns associated with the fingerprints. A sampling component can be configured to identify candidate fingerprints based upon comparisons between the patterns and a violation index. A matching component can be configured to compare the fingerprints to the candidate fingerprints included in a fingerprint repository and to determine sufficient matches between the fingerprints and the candidate fingerprints based upon a policy. An enforcement component can be configured to provide a modification, based upon the policy, to a presentation of the media content in response to the sufficient matches.

Other embodiments relate to methods for modifying a presentation of media content in response to a detected violation. For example, a server that distributes user-broadcasted media content. Fingerprints for various segments of the media content can be created. The fingerprints can be compared to a violation index for identifying candidate fingerprints included in a fingerprint repository. If candidate fingerprints are identified, sufficient matches between the fingerprints and the candidate fingerprints can be identified based upon a policy. If sufficient matches are identified, a presentation of the media content can be altered in accordance with the policy.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
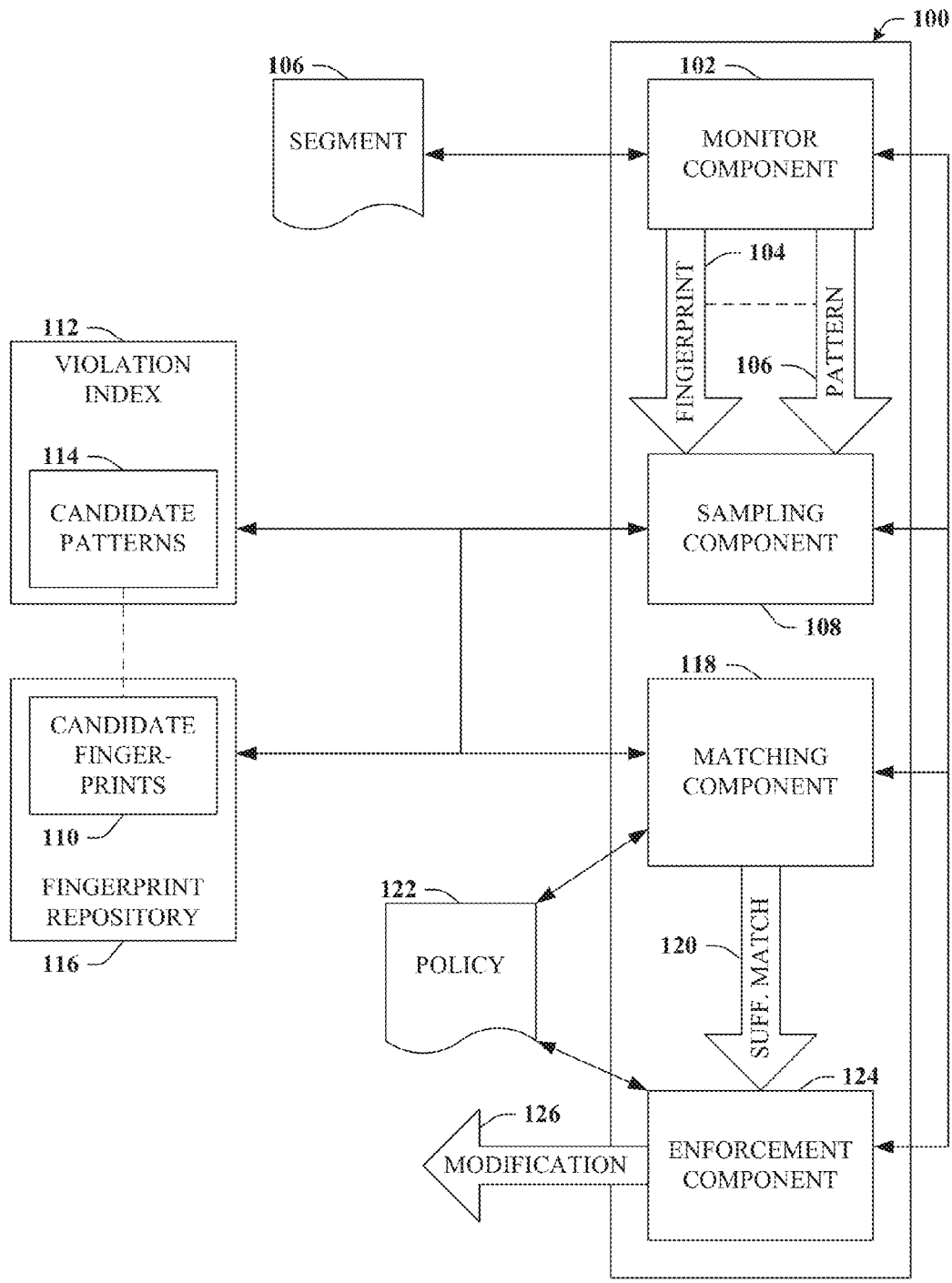
FIG. 1 illustrates a high-level block diagram of an example system that can modify a presentation of media content in response to a detected violation in accordance with certain embodiments of this disclosure.

When users broadcast media content to other users over networking infrastructure provided by a service provider/host, the service provider often has very limited control over the content that is broadcast but might be responsible for violations committed by the users. As a result, service providers are hesitant to allow users the freedom they desire in this regard. For example, many broadcast service providers intentionally limit the number of users who can receive a live stream from another user in order to mitigate the potential for the users to commit copyright violations or other violations.

Systems and methods disclosed herein relate to modifying a presentation of media content in response to a detected violation. By providing efficient techniques for identifying media content violations and automatically modifying a presentation of the media content, various benefits can be realized, particularly in the case of live streams or sequentially streamed (non-live) content that is streamed in real-time. For example, service providers can exercise additional control in order to mitigate attendant risks associated with providing services to its users. Due to this additional protection, service providers can relax other controls, making the service more appealing to users.

The disclosed subject matter can operate without substantial changes to a service provider's infrastructure. Selected media streams (e.g., live video streams) can be monitored in order to detect potential violations. For example, a fingerprint repository with fingerprints of copyrighted media (or other violations) can be accessed. However, rather than comparing every segment of every media stream to the entirety of the fingerprint repository, a pre-processing stage can be utilized, which can greatly increase the efficiency of the monitoring. A violation index can exist on top of the fingerprint repository that includes hashes or patterns of the entries included in the fingerprint repository. The violation index can be referenced, e.g., to rapidly determine a potential violation and to substantially narrow the set of violation candidates to be compared from among the entries in the fingerprint repository.

While potentially millions of entries can exist in the fingerprint repository, segments of the streaming content can be compared to a tiny subset of those entries. Specifically, the fingerprint can be compared with the candidates that were identified by comparing a pattern of the media stream to the patterns included in the violation index. Upon examining a likely subset of the fingerprint repository, if a sufficient match between the streaming content and the candidates is identified, then the broadcast can be modified. For example, the broadcast can be automatically terminated, temporarily interrupted with a notification of the potential violation, or the like. How the potential violation is handled as well as the criteria for determining the sufficient match can be specified in a configurable policy.

Modification to a Presentation of Media Content

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

It is to be appreciated that in accordance with one or more implementations described in this disclosure, users can opt-out of providing personal information, demographic information, location information, proprietary information, sensitive information, or the like in connection with data gathering aspects. Moreover, one or more implementations described herein can provide for anonymizing collected, received, or transmitted data.

Referring now to FIG. 1, a system 100 is depicted. System 100 can modify a presentation of media content in response to a detected violation. Embodiments disclosed herein, for example, can reduce the time and resources necessary to identify potential violations associated with broadcasts of the media content and automatically enact a specified modification to a presentation of the media content upon detection of the violation. Such can enable additional features and improve user satisfaction, and can be particularly useful in connection with live streams. System 100 can include a memory that stores computer executable components and a processor that executes computer executable components stored in the memory, examples of which can be found with reference to FIG. 9. It is to be appreciated that the computer 902 can be used in connection with implementing one or more of the systems or components shown and described in connection with FIG. 1 and other figures disclosed herein. As depicted, system 100 can include a monitor component 102, a sampling component 108, a matching component 118, and an enforcement component 124.

Monitor component 102 can be configured to construct a fingerprint 104 of a segment 106 of media content, which can be all or a portion of the media content. Hence, fingerprint 104 can characterize an encoded representation of segment 106 and/or distinguishing features of segment 106. In some embodiments, fingerprint 104 can be unique for a given segment 106. Monitor component 102 can also construct pattern 106, which can be associated with fingerprint 104. For example, pattern 106 can be a hash or another representation of fingerprint 104.

Both fingerprint 104 and pattern 106 can be provided to sampling component 108 and matching component 118. Sampling component 108 can be configured to identify candidate fingerprints 110 based upon a comparison between pattern 106 and various candidate patterns 114 included in a violation index 112. Fingerprint repository 116 can include a very large number of fingerprints associated with, e.g., copyrighted material, but a full comparison of every entry included in fingerprint repository 116 is not necessary to determine that fingerprint 104 has a match (e.g., segment 106 is a potential violation). Rather, violation index 112, which can include patterns for the entries of fingerprint repository 116 can be searched instead. By comparing pattern 106 to violation index 112, a set of candidate patterns 114 can be identified in an initial pass.

These candidate patterns 114 in violation index 112 can indicate that associated candidate fingerprints 110 in fingerprint repository 116 are potential matches of fingerprint 104. Hence, assuming sampling component 108 does identify one or more candidate fingerprints 110, matching component 118 can be configured to compare fingerprint 104 to candidate fingerprint(s) 110 rather than performing the comparison with all entries of fingerprint repository 116. Matching component 118 can also be configured to determine whether there is a sufficient match 120 between fingerprint 104 and candidate 110. Sufficient match 120 can be determined based upon criteria included in policy 122, which is further described with reference to FIG. 3A.

Assuming a sufficient match 120 is determined, then it can be established to some degree of certain (e.g., based upon policy 122) that segment 106 and/or the media content matches media content that is in violation or otherwise unauthorized (e.g., copyrighted media). In response to sufficient match 120 being detected, enforcement component 124 can provide modification 126 to a presentation of the media content. The type of action (e.g., the type of modification 126 to apply) is further detailed in connection with FIG. 3B and can be defined by policy 122.

Figure 2:
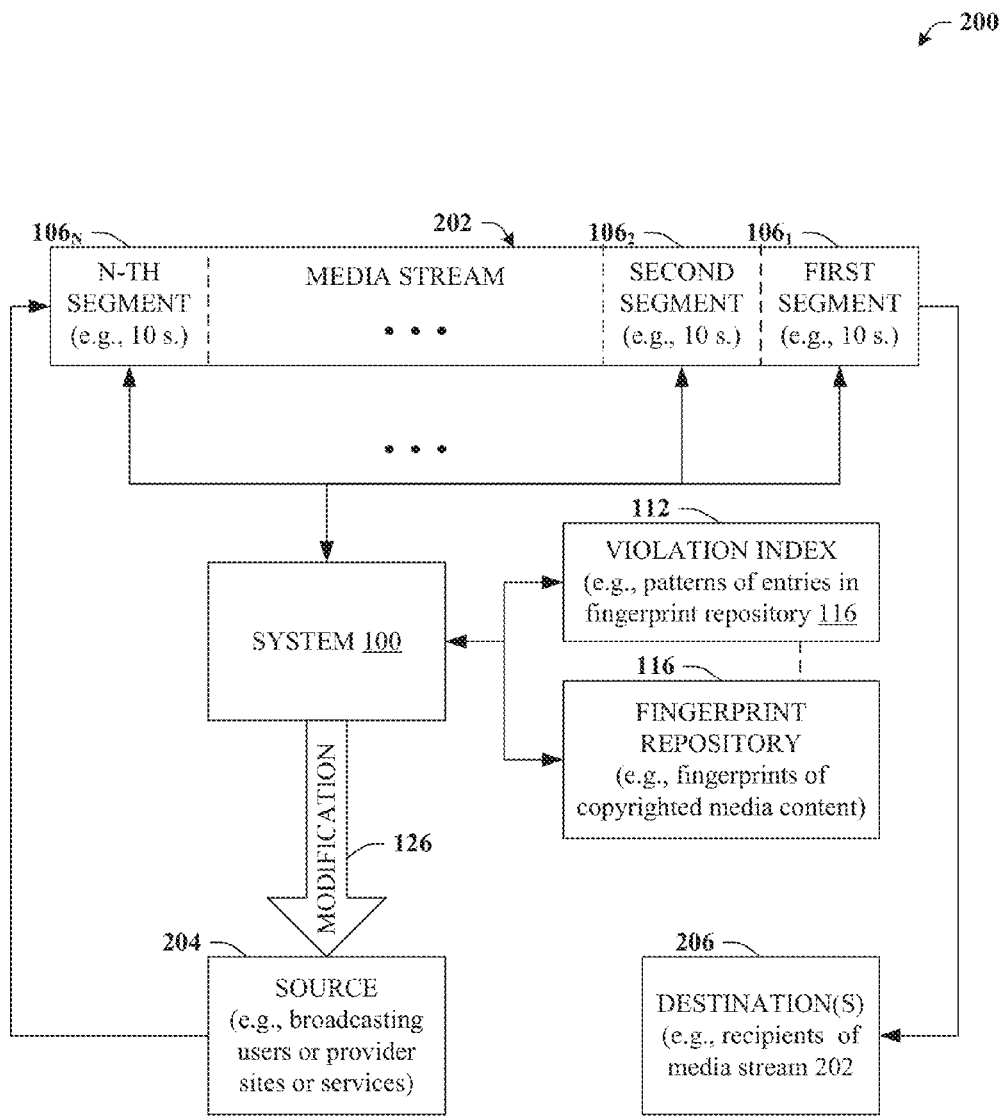
FIG. 2 illustrates a block diagram of a system that can provide for addition features associated with modifying a presentation of media content in response to a detected violation in accordance with certain embodiments of this disclosure.

Turning now to FIG. 2, system 200 is depicted. System 200 provides addition features associated with modifying a presentation of media content in response to a detected violation. System 200 can include all or a subset of system 100 as well as other components detailed herein. For example, in some embodiments the media content monitored by system 100 can be a live media stream 202 that is broadcasted by source 204 and received and presented at destination(s) 206. Source 204 can represent the broadcasting users or, by proxy, the provider of the broadcasting service. In some embodiments, media stream 202 can be sourced from multiple cooperating broadcasters and received by multiple recipients.

As described, segment 106 can represent all or a portion of the media stream. In this example, media stream is partitioned into many 10-second slices of media stream 202 denoted $106_1$-$106_N$, where N can be substantially any positive integer. System 100 (e.g., monitor component 102) can monitor each segment 106 in succession, potentially in real time during the live broadcast in order to determine whether the media content or some portion of the media content is a potential violation, which can be determined (e.g., by sampling component 108 and matching component 118) with access to violation index 112 and fingerprint repository 116. If a sufficient match 120 is identified, then system 100 (e.g., enforcement component 124) can instruct a stream controller included in infrastructure of the service provider or the broadcasting device (e.g., source 204) to take some remedial action that implements modification 126 to a presentation of the media content.

Figure 3A:
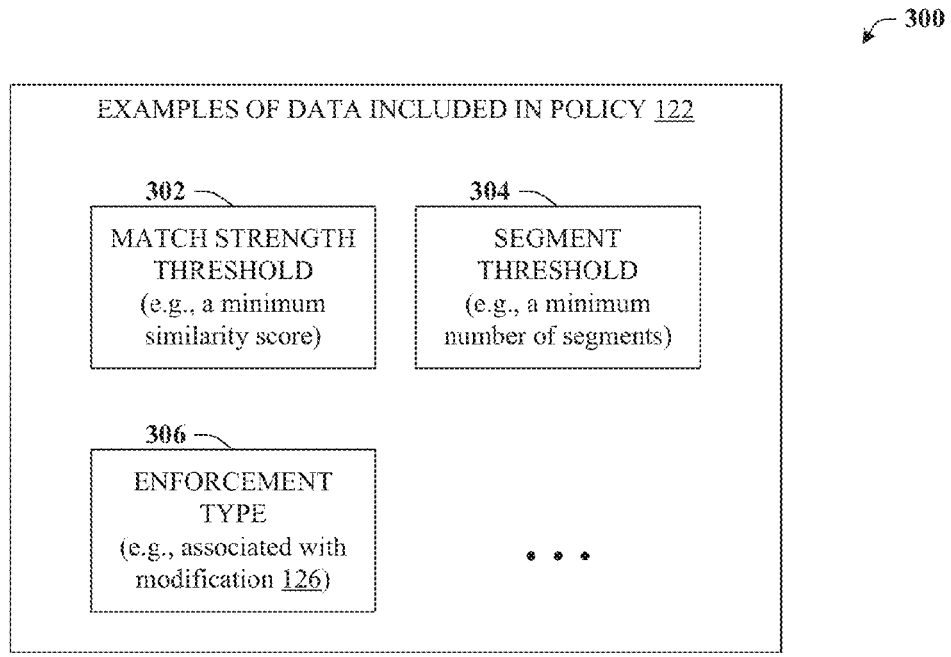
FIG. 3A is a block illustration that depicts various examples of data included in the policy in accordance with certain embodiments of this disclosure.
Figure 3B:
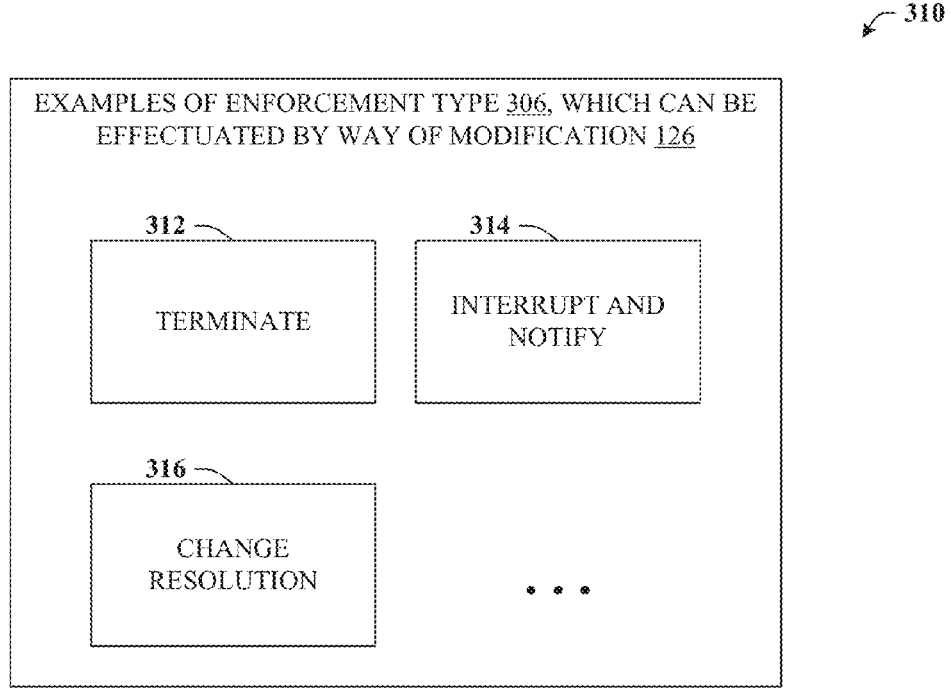
FIG. 3B is a block illustration that depicts various examples of an enforcement type associated with the modification in accordance with certain embodiments of this disclosure.

While still referring to FIGS. 1 and 2, turning as well to FIGS. 3A and 3B, illustrations 300 and 310 are provided. Illustration 300 depicts various examples of data included in policy 122, which can be utilized to determine confidence parameters associated with determining a sufficient match 120 as well as the type of enforcement to be taken upon identification of a sufficient match 120. For example, policy 122 can include a match strength threshold 302 and a segment threshold 304. The match strength threshold 302 can describe a minimum similarity score between fingerprint 104 and candidate fingerprint 110. The segment threshold 304 can describe a minimum number of segments 106 of the media content that exceed match strength threshold.

For example, policy 122 can indicate that a match strength of 70% is required for one minute of video in order to establish a sufficient match. If segments 106 are 10 seconds in length as provided in the previous example, then at least 6 segments of the media content must meet or exceed a match strength similarity score of 70% in order to identify sufficient match 120 and issue modification 126. Policy 122 can also include data associated with a type of modification 126 to issue, which is denoted enforcement type 306 and is further detailed in connection FIG. 3B.

Illustration 310 provides various examples of enforcement type 306 which can be effectuated by way of modification 126. For example, enforcement type 306 can relate to a termination of the presentation of media content (e.g., terminate 312). In this case, if sufficient match 120 is identified, then source 204 can be instructed (by way of modification 126) to terminate the live media stream in order to prevent a potential violation.

As another example, enforcement type 306 can of the interrupt and notify 314 variety. Interrupt and notify 314 can relate to temporarily interrupting the presentation of the media stream. During the temporary interruption, all or a subset of users (e.g., broadcasting and/or recipient users) can be notified of a potential violation. Additionally, feedback can be solicited (e.g., use authorization, acknowledgment of notice, verification of non-violation, etc.) and depending upon the feedback, the presentation can either resume or terminate.

Enforcement type 306 can also relate to change resolution 316. For instance, modification 126 can effectuate a change to the resolution or quality of the presentation of the media content. Such can be particularly relevant to adaptive streaming architectures and can be utilized in cases were some versions of the media content invoke a violation (e.g., high resolution versions), while other versions (e.g., lower resolution versions) do not.

Referring back to FIG. 1, in some embodiments, enforcement component 124 can select the enforcement type 306 to provide based upon the strength of sufficient match 120. For example, if sufficient match 120 barely meets the criteria thresholds included in policy 122, or meets a first threshold but not a second threshold, then interrupt and notify 314 can be selected. Enforcement component 124 can transition to other enforcement types 306 if the match strength does not decrease.

Figure 4:
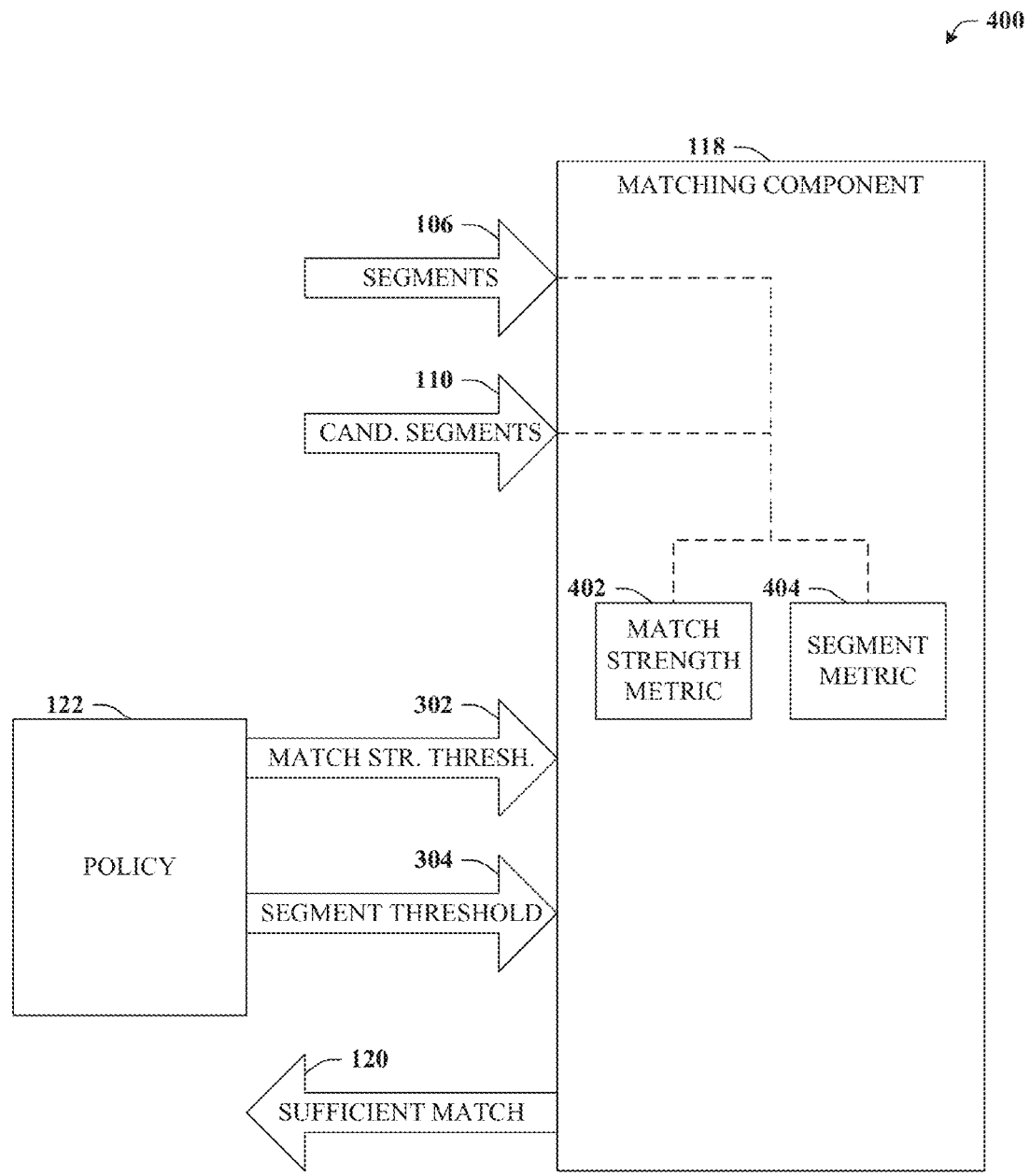
FIG. 4 illustrates a block diagram of a system that can provide for additional features in connection with determining the sufficient match in accordance with certain embodiments of this disclosure.

With reference now to FIG. 4, system 400 is depicted. System 400 can provide for additional features in connection with determining the sufficient match 120. System 400 can include matching component 118 that can compare fingerprints 104 to candidate fingerprints 110 included in fingerprint repository 116 in order to determine sufficient match 120, as detailed with respect to system 100 of FIG. 1. In some embodiments matching component 118 can be further configured to determine sufficient match 120 in response to a match strength metric 402 and a segment metric 404 respectively exceeding match strength threshold 302 and segment threshold 304 described by policy 122.

For example, matching component 118 can receive segments 106 as well as associated candidate segments 110, which can be utilized to perform a comparison. If a high degree of similarity exists between a given segment 106 and an associated candidate segment 110, then match strength metric 402 will be relatively high. As additional segments 106 with high match strength accumulate, segment metric 404 will increase. If match strength metric 402 meets or exceeds match strength threshold 302 defined in policy 122, and segment metric 404 meets or exceeds segment threshold 304, then matching component 118 can determine that segments 106 and candidate segments 110 are similar enough based upon policy 122 to issue sufficient match 120. Sufficient match 120 can be received by enforcement component 124, which can then issue modification 126 that will alter the presentation of the media stream based upon the enforcement type 306 described by policy 122.

Figure 5:
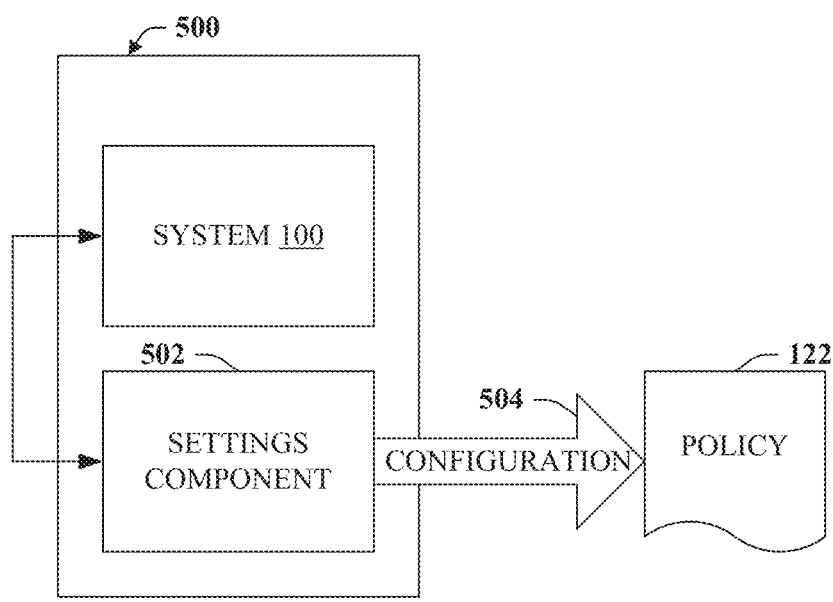
FIG. 5 illustrates a block diagram of a system that can configure the policy in connection with modifying a presentation of the media content in accordance with certain embodiments of this disclosure.

Referring now to FIG. 5, system 500 is depicted. System 500 can relate to configuring the policy 122 in connection with modifying a presentation of the media content in response to a detected violation. System 500 can include all or portions of system 100 as described previously or other systems or components detailed herein. In addition, system 500 can include settings component 502. Settings component 502 can configure policy 122 by way of configuration 504.

For example, in some embodiments configuration 504 can set or update match strength threshold 302, which can represent the similarity between two fingerprints to be deemed a sufficient match to some confidence value. Additionally or alternatively, configuration 504 can set or update segment threshold 304, which can represent a minimum number of segments that match. Configuration 504 can also set or update enforcement type 306 associated with modification 126. For example, configuration 504 can set the enforcement type 306 to terminate the presentation of media content, interrupt the presentation and/or notify a user associated with the presentation, adapt the resolution of the presentation and so on.

Figure 6:
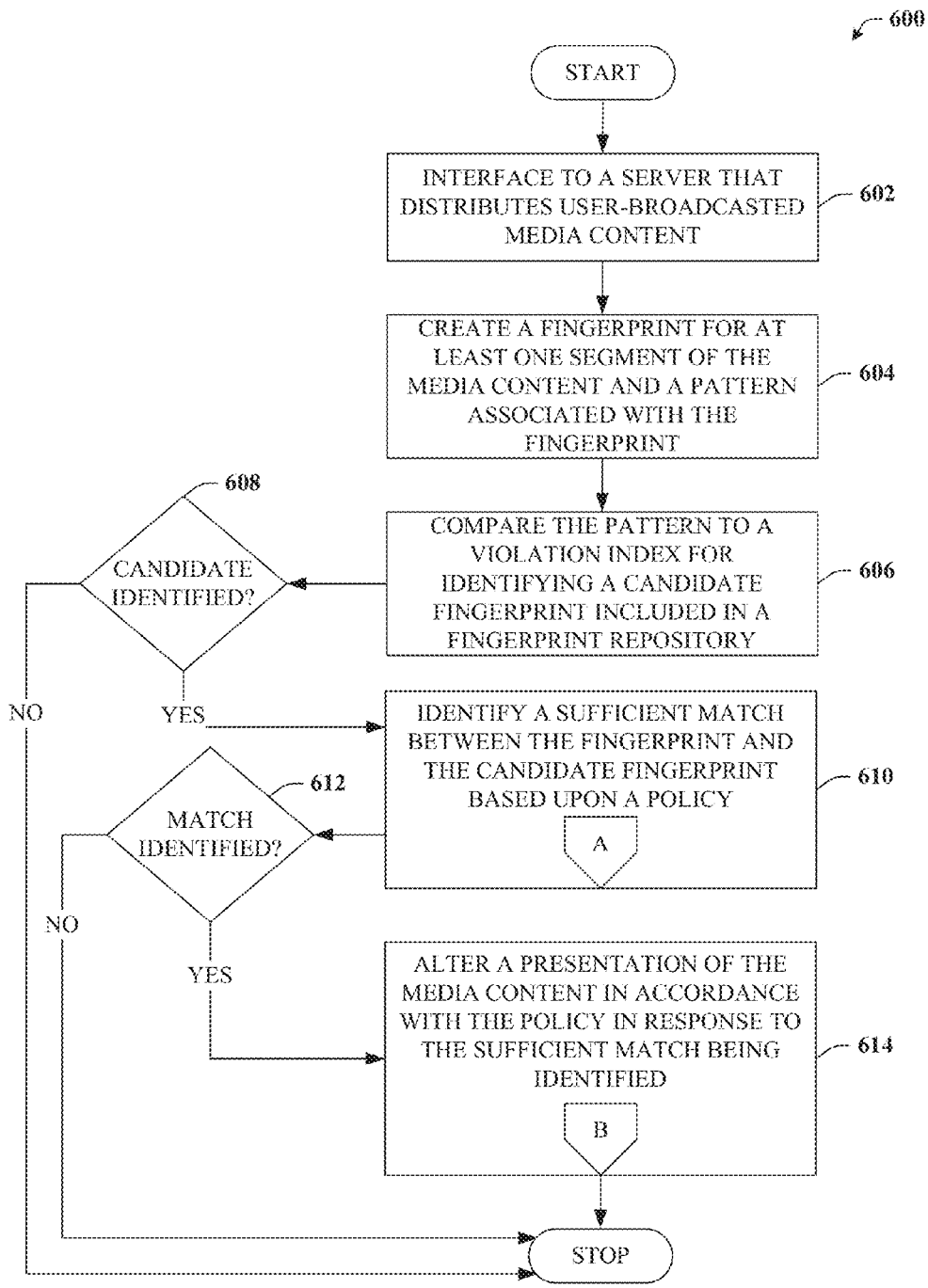
FIG. 6 illustrates an example methodology that can provide for modifying a presentation of media content in response to a detected violation in accordance with certain embodiments of this disclosure.
Figure 7:
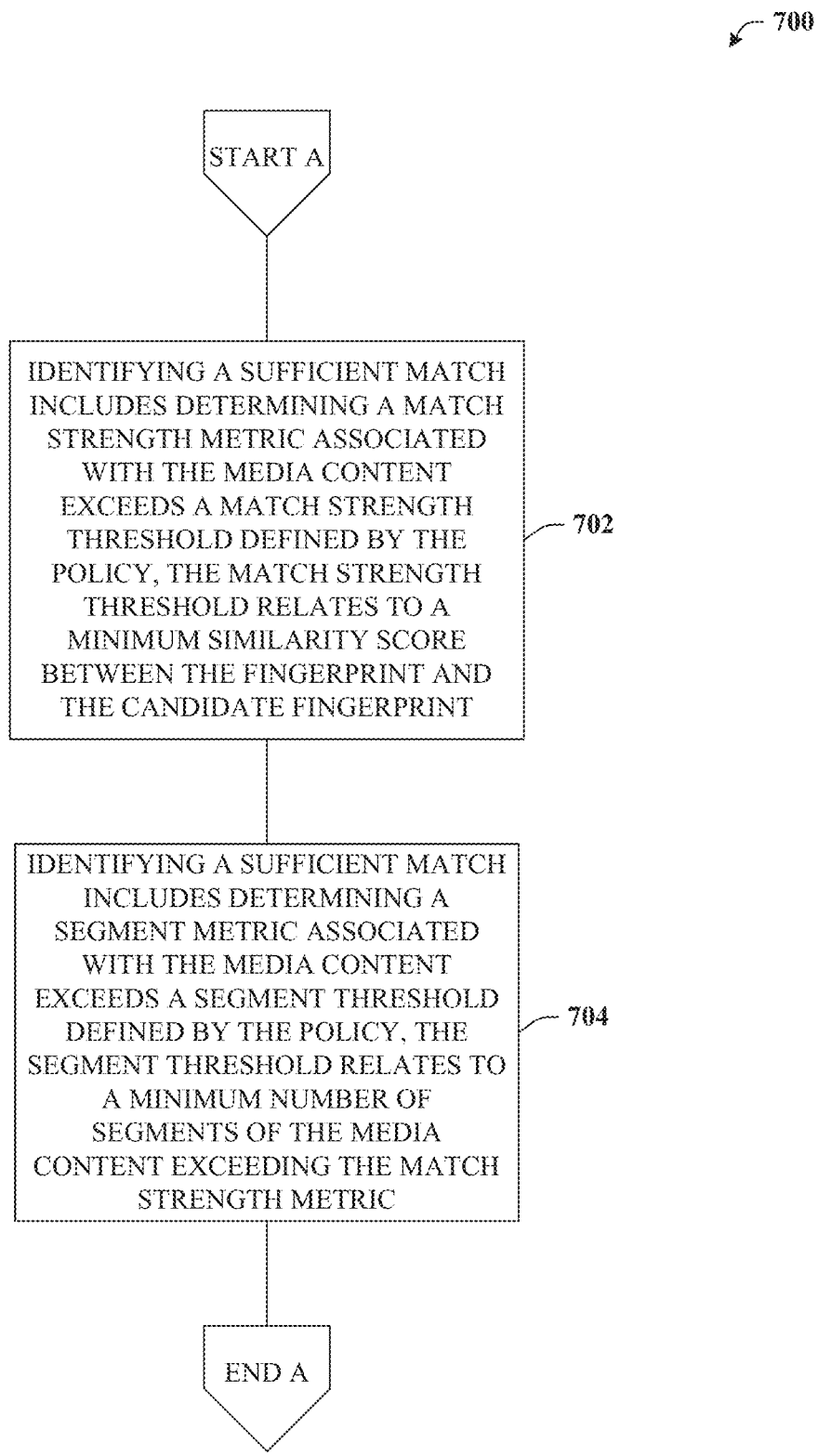
FIG. 7 illustrates an example methodology that can provide for additional features associated with identifying a sufficient match in accordance with certain embodiments of this disclosure.
Figure 8:
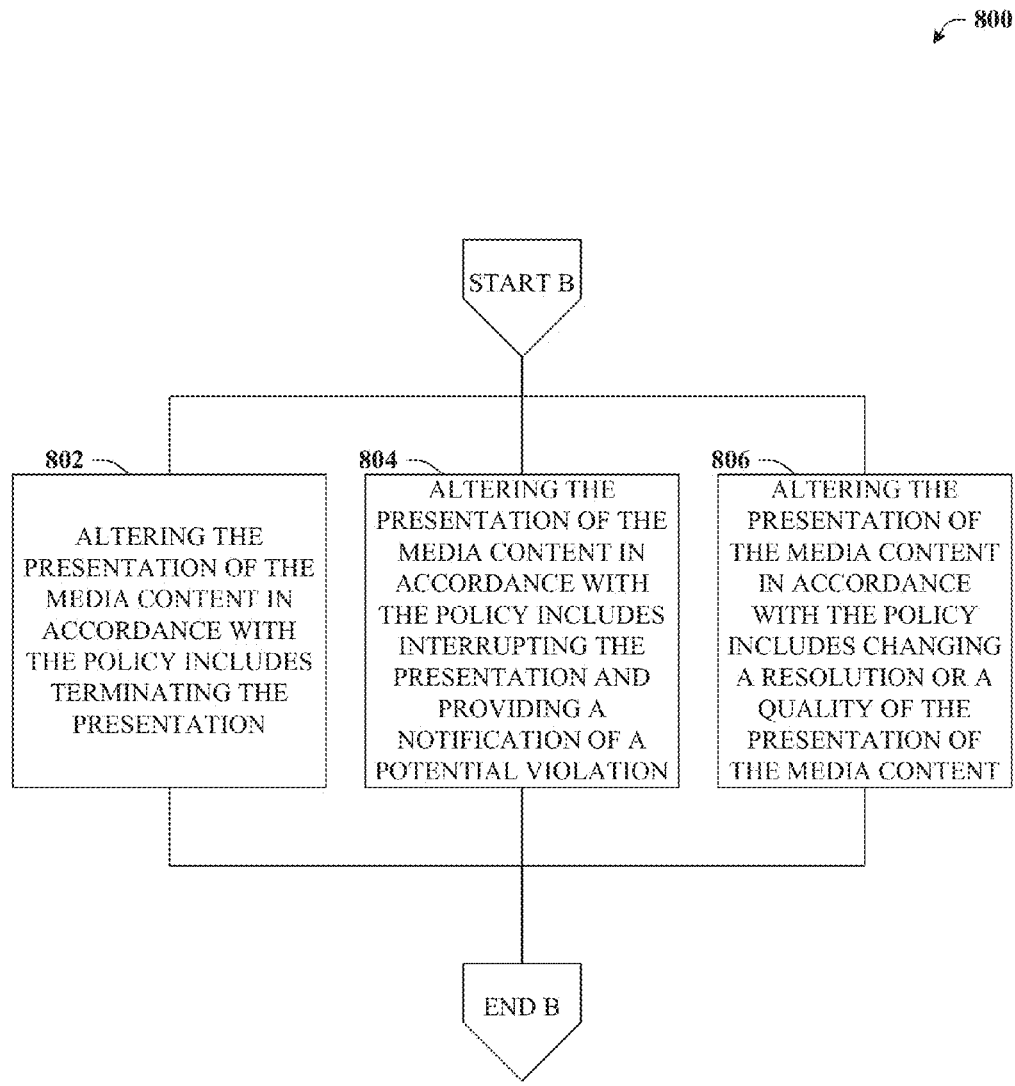
FIG. 8 illustrates an example methodology that can provide for additional features associated with altering the presentation of the media content in accordance with certain embodiments of this disclosure.

FIGS. 6-8 illustrate various methodologies in accordance with certain embodiments of this disclosure. While, for purposes of simplicity of explanation, the methodologies are shown and described as a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media.

FIG. 6 illustrates exemplary method 600. Method 600 can provide for modifying a presentation of media content in response to a detected violation. For example, at reference numeral 602, server(s) or other provider infrastructure that distributes user-broadcasted media content can be interfaced to. Therefore, the media broadcast as well as stream controller associated with the media broadcast can be accessed.

At reference numeral 604, a fingerprint for at least one segments of the media content can be created. A pattern and/or hash based upon fingerprint can also be created. The At reference numeral 606, the pattern can be compared to a violation index for identifying candidate fingerprints included in a fingerprint repository. Candidate fingerprints can be identified based upon the pattern since the violation index can include pattern entries that relate to associated entries included in the fingerprint repository. Method 600 can then proceed to decision 608.

At reference numeral 608, it can be determined whether or not candidate fingerprints were identified. If not, then the method ends. If so, the method continues on to reference numeral 610. At reference numeral 610, a sufficient match between the fingerprint and the candidate fingerprint(s) can be identified. The sufficient match can be identified based upon a policy that can, e.g., provide various thresholds that must be met or exceed in order to indicate a sufficient match.

Method 600 continues to reference numeral 612 where it is determined whether or not a sufficient match was identified. If not, then the method terminates. Otherwise, if a sufficient match was identified, then the method can proceed to reference numeral 612. At reference numeral 612, a presentation of the media content can be altered in accordance with the policy.

Turning now to FIG. 7, exemplary method 700 is depicted. Method 700 can provide for additional features associated with identifying a sufficient match described with connection with reference numeral 612 of FIG. 6. Method 700 can begin at the start of insert A. For example, at reference numeral 702, identifying a sufficient match can include determining a match strength metric associated with the media content exceeds a match strength threshold defined by the policy. In some embodiments, the match strength threshold relates to a minimum similarity score between the fingerprint and the candidate fingerprint.

At reference numeral 704, identifying a sufficient match includes determining a segment metric associated with the media content exceeds a segment threshold defined by the policy. In some embodiments, the segment threshold relates to a minimum number of segments of the media content that exceed the match strength metric. Method 700 can end with the end of insert A.

Turning now to FIG. 8, example method 800 is illustrated. Method 800 can provide for additional features associated with altering the presentation of the media content in connection with reference numeral 614 of FIG. 6. Method 800 can begin with the start of insert B, which proceeds to one of reference numerals 802, 804, or 806. At reference numeral 802, altering a presentation of the media content in accordance with a policy includes terminating the presentation.

At reference numeral 804, altering a presentation of the media content in accordance with a policy includes interrupting the presentation and providing a notification of a potential violation to users associated with the presentation. For example, a broadcasting user or one or several recipient user.

At reference numeral 806, altering a presentation of the media content in accordance with a policy includes changing a resolution or a quality of the presentation of the media content. For example, the resolution of the media content can be adapted to a lower resolution and/or a lower quality.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 9:
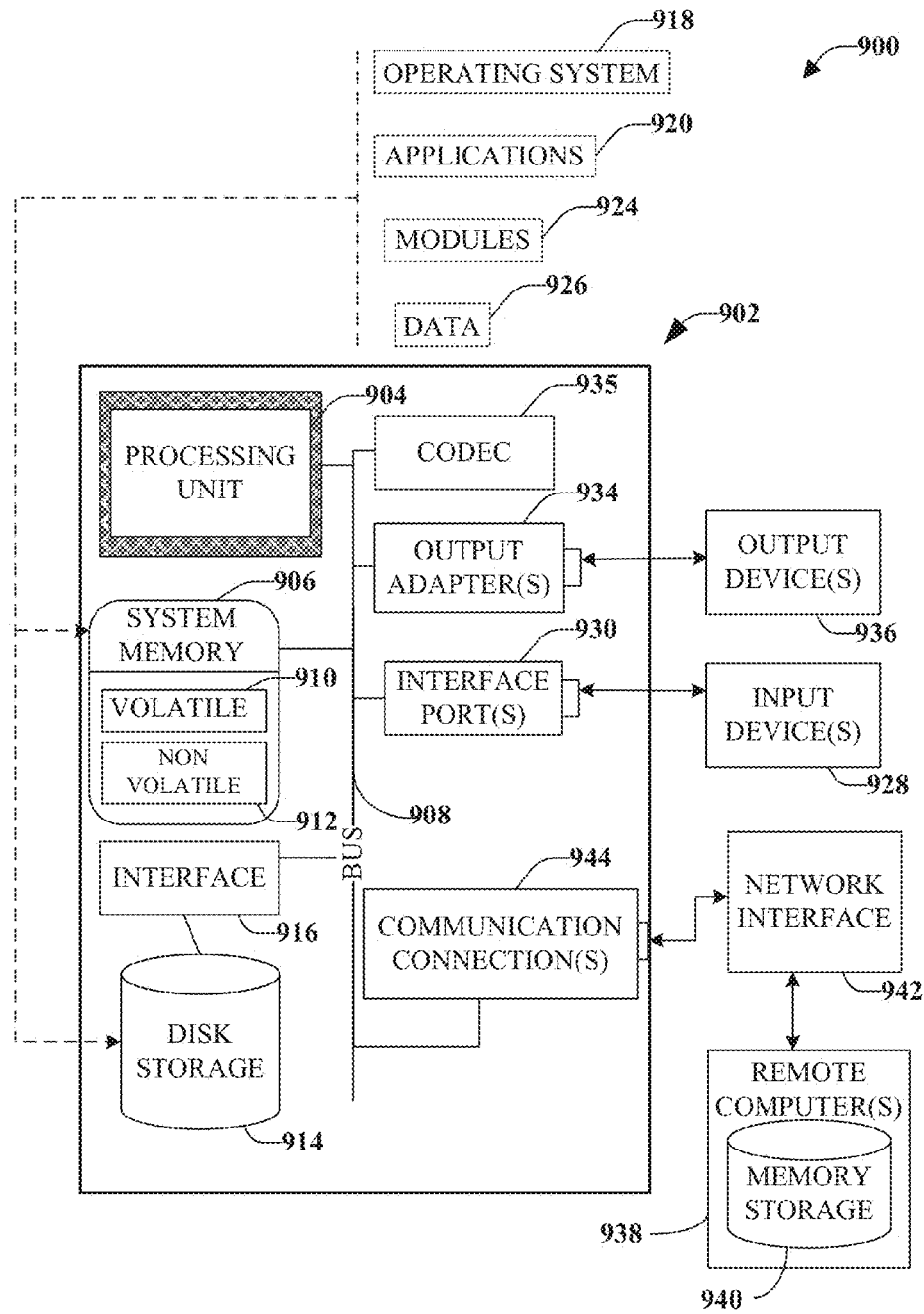
FIG. 9 illustrates an example schematic block diagram for a computing environment in accordance with certain embodiments of this disclosure.

With reference to FIG. 9, a suitable environment 900 for implementing various aspects of the claimed subject matter includes a computer 902. The computer 902 includes a processing unit 904, a system memory 906, a codec 935, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 906 includes volatile memory 910 and non-volatile memory 912. The basic input/output system (BIOS), containing the basic routines to transfer information between elements within the computer 902, such as during start-up, is stored in non-volatile memory 912. In addition, according to present innovations, codec 935 may include at least one of an encoder or decoder, wherein the at least one of an encoder or decoder may consist of hardware, software, or a combination of hardware and software. For example, in one or more embodiments, all or portions of codec 935 can be included in encoding component 118 and/or decoding component 514. Although, codec 935 is depicted as a separate component, codec 935 may be contained within non-volatile memory 912. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 902 may also include removable/non-removable, volatile/non-volatile computer storage medium. FIG. 9 illustrates, for example, disk storage 914. Disk storage 914 includes, but is not limited to, devices like a magnetic disk drive, solid state disk (SSD) floppy disk drive, tape drive, Jaz drive, Zip drive, LS-100 drive, flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916. It is appreciated that storage devices 914 can store information related to a user. Such information might be stored at or provided to a server or to an application running on a user device. In one embodiment, the user can be notified (e.g., by way of output device(s) 936) of the types of information that are stored to disk storage 914 and/or transmitted to the server or application. The user can be provided the opportunity to opt-in or opt-out of having such information collected and/or shared with the server or application (e.g., by way of input from input device(s) 928).

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902 and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Figure 10:
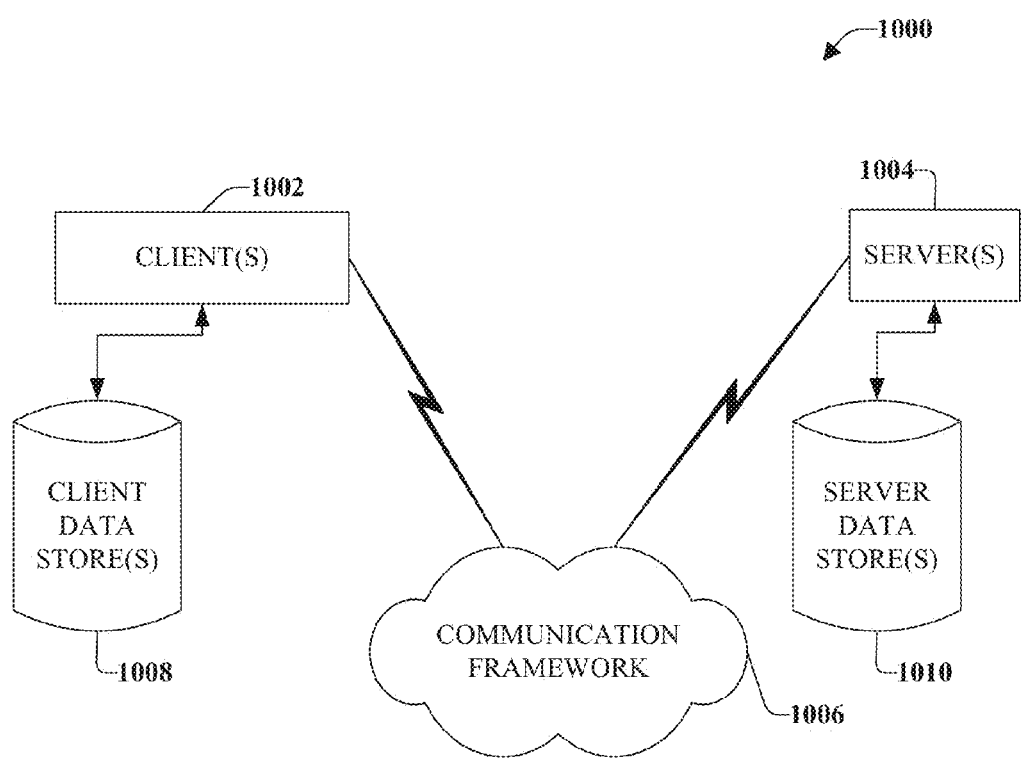
FIG. 10 illustrates an example block diagram of a computer operable to execute certain embodiments of this disclosure.

Referring now to FIG. 10, there is illustrated a schematic block diagram of a computing environment 1000 in accordance with this specification. The system 1000 includes one or more client(s) 1002 (e.g., laptops, smart phones, PDAs, media players, computers, portable electronic devices, tablets, and the like). The client(s) 1002 can be hardware and/or software (e.g., threads, processes, computing devices). The system 1000 also includes one or more server(s) 1004. The server(s) 1004 can also be hardware or hardware in combination with software (e.g., threads, processes, computing devices). The servers 1004 can house threads to perform transformations by employing aspects of this disclosure, for example. One possible communication between a client 1002 and a server 1004 can be in the form of a data packet transmitted between two or more computer processes wherein the data packet may include video data. The data packet can include a cookie and/or associated contextual information, for example. The system 1000 includes a communication framework 1006 (e.g., a global communication network such as the Internet, or mobile network(s)) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one embodiment, a client 1002 can transfer an encoded file, in accordance with the disclosed subject matter, to server 1004. Server 1004 can store the file, decode the file, or transmit the file to another client 1002. It is to be appreciated, that a client 1002 can also transfer uncompressed file to a server 1004 and server 1004 can compress the file in accordance with the disclosed subject matter. Likewise, server 1004 can encode video information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A system, comprising:
    a memory, communicatively coupled to a processor, the memory having stored therein executable instructions, comprising:
        a monitor component configured to construct respective fingerprints of a plurality of segments of a media content that is broadcasted as a live stream and construct respective patterns representing the fingerprints;
        a sampling component configured to identify a plurality of candidate fingerprints representing segments of another media content based upon a comparison between the patterns and candidate patterns in a violation index, wherein the candidate patterns represent candidate fingerprints in a fingerprint repository associated with a plurality of other media content;
        a matching component configured to compare fingerprints associated with the patterns that match the candidate patterns associated with the identified candidate fingerprints, to the identified candidate fingerprints to determine whether the media content matches the other media content based upon a segment metric associated with the media content exceeding a segment threshold and respective match strength metrics associated with the fingerprints associated with the patterns that match the candidate patterns associated with the identified candidate fingerprints exceeding a match strength threshold, wherein the match strength threshold describes a minimum similarity score between a fingerprint and a candidate fingerprint and the segment threshold describes a minimum number of segments of the media content having respective fingerprints that exceed the match strength threshold; and
        an enforcement component configured to, in response to a determination that the media content matches the other media content, provide a modification to a presentation of the media content.

2. The system of claim 1, wherein the at least one pattern and respective candidate patterns are hashes.

3. The system of claim 1, wherein the media content is formatted as a live video stream uploaded by a broadcasting user and received by at least one recipient user.

4. The system of claim 1, wherein the at least one segment is approximately 10 seconds.

5. The system of claim 1, wherein the respective candidate fingerprints represent respective segments of copyrighted media content.

6. The system of claim 1, wherein the modification comprises interruption of the presentation of the media content with a notification of a potential violation.

7. The system of claim 6, wherein the notification further requests feedback on the violation.

8. The system of claim 1, wherein the modification comprises termination of the presentation of the media content.

9. The system of claim 1, wherein the modification comprises a change to the resolution of the presentation of the media content.

10. A method, comprising:
    creating, by a system including a processor, respective fingerprints of a plurality of segments of a media content and respective patterns representing the fingerprints;
    identifying, by the system, a plurality of candidate fingerprints representing segments of another media content by comparing the patterns and candidate patterns in a violation index, wherein the candidate patterns represent candidate fingerprints included in a fingerprint repository associated with a plurality of other media content;
    determining, by the system, whether the media content matches another media content based upon a comparison of fingerprints, associated with the patterns that match the candidate patterns associated with the identified candidate fingerprints, to the identified candidate fingerprints, and a segment metric associated with the media content exceeding a segment threshold and respective match strength metrics associated with the fingerprints associated with the patterns that match the candidate patterns associated with the identified candidate fingerprints exceeding a match strength threshold, wherein the match strength threshold describes a minimum similarity score between a fingerprint and a candidate fingerprint and the segment threshold describes a minimum number of segments of the media content having respective fingerprints that exceed the match strength threshold; and
    altering, by the system, a presentation of the media content in response to a determination that the media content matches the other media content.

11. The method of claim 10, wherein the altering the presentation of the media content comprises interrupting the presentation of the media content and providing a notification of a potential violation.

12. The method of claim 10, wherein the altering the presentation of the media content comprises terminating the presentation of the media content.

13. The method of claim 10, wherein the altering the presentation of the media content comprises a change of resolution of the presentation of the media content.

14. A non-transitory computer-readable medium having instructions stored thereon that, in response to execution, cause a system including a processor to perform operations comprising:

generating respective fingerprints of a plurality of segments of a media content;

producing respective patterns representing the fingerprints;

identifying a plurality of candidate fingerprints associated with segments of another media content by comparing the patterns and candidate patterns in a violation index, wherein the candidate patterns represent candidate fingerprints included in a fingerprint repository associated with a plurality of other media content;

determining whether the media content matches another media content based upon a comparison of fingerprints, associated with the patterns that match the candidate patterns associated with the identified candidate fingerprints, to the identified candidate fingerprints, and a segment metric associated with the media content exceeding a segment threshold and respective match strength metrics associated with the fingerprints associated with the patterns that match the candidate patterns associated with the identified candidate fingerprints exceeding a match strength threshold, wherein the match strength threshold describes a minimum similarity score between a fingerprint and a candidate fingerprint and the segment threshold describes a minimum number of segments of the media content having respective fingerprints that exceed the match strength threshold; and changing a presentation of the media content in response to a determination that the at least one fingerprint media content matches the other media content.

15. The system of claim 14, wherein the changing comprises interrupting the presentation of the media content and presenting a notification of a potential violation in response to the determination that the at least one fingerprint matches the at least one candidate fingerprint.

16. The system of claim 14, wherein changing comprises terminating the presentation of the media content in response to the determination that the at least one fingerprint matches the at least one candidate fingerprint.

17. The system of claim 14, wherein changing comprises modifying a resolution of the presentation of the media content in response to the determination that the at least one fingerprint matches the at least one candidate fingerprint.

\* \* \* \* \*